(12) United States Patent
Tremp et al.

(10) Patent No.: US 11,883,885 B2
(45) Date of Patent: Jan. 30, 2024

(54) RETENTION CHUCK FOR MACHINES FOR PRODUCING GLASS CONTAINERS

(71) Applicant: SCHOTT PHARMA SCHWEIZ AG, St. Gallen (CH)

(72) Inventors: Marcel Tremp, Speicher (CH); Marco Otero, St. Gallen (CH)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 215 days.

(21) Appl. No.: 16/993,528

(22) Filed: Aug. 14, 2020

(65) Prior Publication Data

US 2021/0024401 A1     Jan. 28, 2021

Related U.S. Application Data

(63) Continuation of application No. PCT/EP2019/052717, filed on Feb. 5, 2019.

(30) Foreign Application Priority Data

Feb. 15, 2018    (DE) ..................... 10 2018 103 441.5

(51) Int. Cl.
    *B23B 31/175*     (2006.01)
    *C03B 23/045*     (2006.01)

(52) U.S. Cl.
    CPC ...... *B23B 31/16195* (2013.01); *C03B 23/045* (2013.01); *Y10T 279/1961* (2015.01)

(58) Field of Classification Search
    CPC .......... B23B 31/16195; B23B 31/1627; C03B 23/045; Y10T 279/1961; Y10T 279/19; Y10T 279/17666; Y10T 279/17743
    See application file for complete search history.

(56) References Cited

U.S. PATENT DOCUMENTS 1,956,272 A * 4/1934 Church ................... B23B 31/32
                                                                                                          279/139
5,167,175 A * 12/1992 Rohm ..................... B23B 31/28
                                                                                                          279/110
(Continued)

FOREIGN PATENT DOCUMENTS

| CA | 2048134 | 2/1992 |
|---|---|---|
| CN | 103073177 | 5/2013 |

(Continued)

OTHER PUBLICATIONS

English translation of International Search Report dated Apr. 18, 2019 for International Application No. PCT/EP/2019/052717, 2 pages.

(Continued)

*Primary Examiner* — Eric A. Gates
*Assistant Examiner* — Reinaldo A Vargas Del Rio
(74) *Attorney, Agent, or Firm* — Ruggiero McAllister & McMahon LLC

(57) ABSTRACT

A retention chuck for glass pipes for machines producing glass containers is provided. The retention chuck has a central supply channel for the glass pipes, a plurality of adjustable clamping jaws arranged at the lower end of the supply channel and so as to be distributed around a centerline of the channel. The spacing of the jaws from the center line of the supply channel is adjustable by an actuation element. A coupling element couples the jaws to the actuation element. Guides guide the adjustment movement of the clamping jaws perpendicularly, radially inwardly relative to the center line.

17 Claims, 7 Drawing Sheets

(56) References Cited

U.S. PATENT DOCUMENTS

| | | |
|---|---|---|
| 5,178,401 A | 1/1993 | Maennl |
| 2014/0305169 A1 | 10/2014 | Pulz |

FOREIGN PATENT DOCUMENTS

| | | | | |
|---|---|---|---|---|
| CN | 104098263 | | 10/2014 | |
| DE | 102008058211 | | 5/2010 | |
| EP | 0469297 | | 2/1992 | |
| FR | 680782 | | 5/1930 | |
| JP | 2001019451 | | 1/2001 | |
| JP | 2001019451 A | * | 1/2001 | ........... C03B 23/045 |
| JP | 2014067569 A | * | 4/2014 | |
| SE | 508570 C2 | * | 10/1998 | ....... B23B 31/16195 |

OTHER PUBLICATIONS

English translation of Written Opinion dated Apr. 18, 2019 for International Application No. PCT/EP/2019/052717, 5 pages.
English translation of International Preliminary Report on Patentability dated Aug. 18, 2020 for International Application No. PCT/EP/2019/052717, 6 pages.

\* cited by examiner

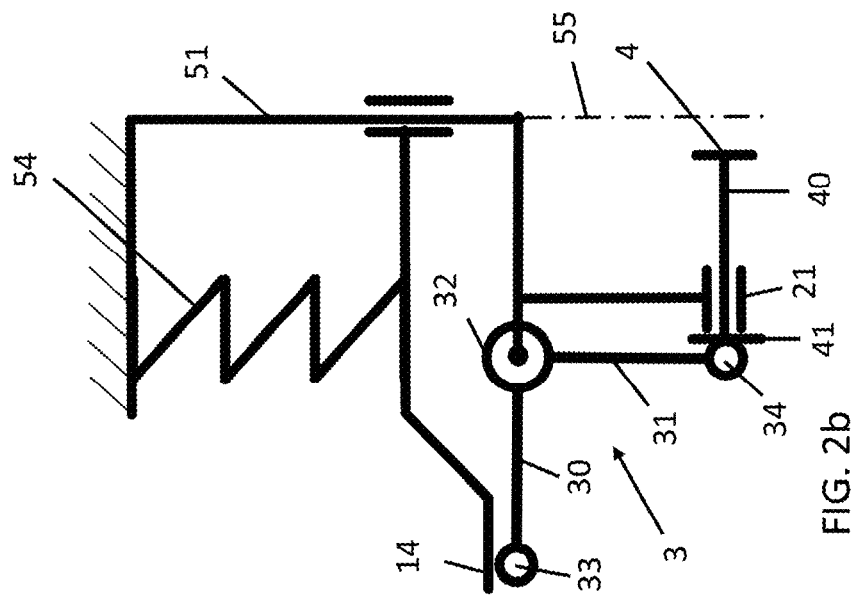
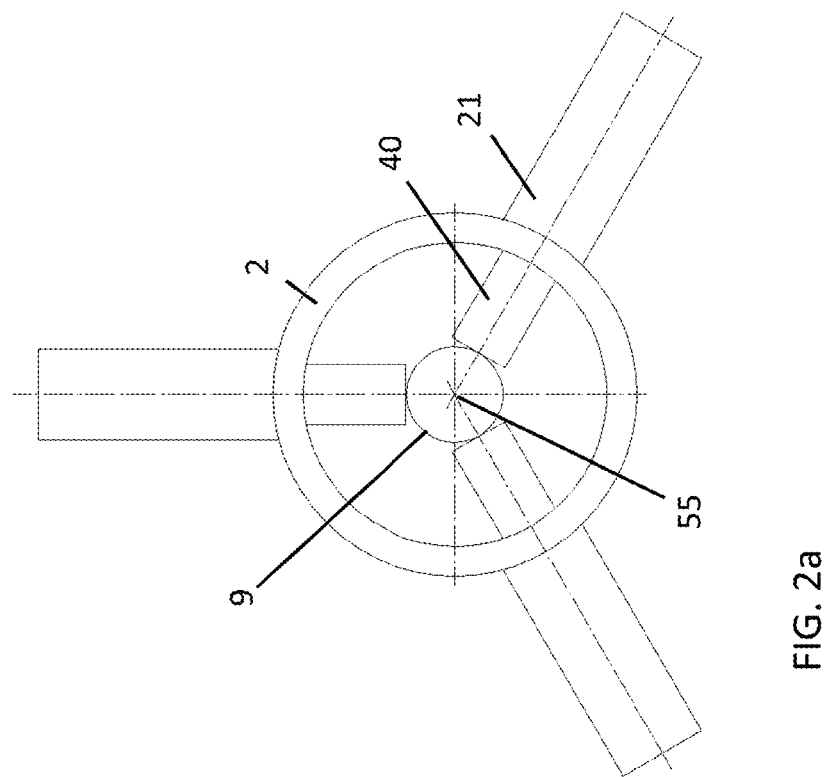

RETENTION CHUCK FOR MACHINES FOR PRODUCING GLASS CONTAINERS

CROSS REFERENCE TO RELATED APPLICATIONS

This application is a continuation of International Application PCT/EP2019/052717 filed on Feb. 5, 2019, which claims the benefit of German application 10 2018 103 441.5 filed Feb. 15, 2018, the entire contents of both of which are expressly incorporated herein by reference.

BACKGROUND

1. Field of the Invention

The present invention generally relates to the production of glass containers, in particular for use as primary packing means for pharmaceutical active ingredients, for example, as glass bottles (vials), cartridges or syringe bodies, and relates in particular to a retention chuck for machines which can be provided with glass pipes for producing such glass containers.

2. Description of Related Art

Retention chucks for pipes or cylindrical symmetrical workpieces are extremely well known in the prior art. However, particular demands are placed on retention chucks for glass pipes since glass pipes withstand only small radial clamping forces and break when excessively high forces are applied. Retention chucks in conventional hot-forming machines for the production of vials from pipes further require that the chuck has to be opened and closed very rapidly and that the retention chuck reliably clamps the glass pipe after the clamping without applying a force acting from the outer side on the retention chuck.

A retention chuck is known from EP 0 469 297 A2 by the same Applicant and has a central supply channel for the glass pipes, a plurality of adjustable clamping jaws at the lower end of the supply channel and arranged so as to be distributed around the opening thereof, whose spacing with respect to the center line of the supply channel can be adjusted, an actuation element for common adjustment of the clamping jaws, a gear mechanism which couples the adjustable clamping jaws to the actuation element and guides in order to guide an adjustment movement of the clamping jaws perpendicularly, radially inwardly relative to the center line of the supply channel. As a result of this construction, the clamping jaws are free from a longitudinal movement when gripping the glass pipes and can consequently grip the glass pipe free from displacement in the longitudinal direction. Consequently, a secure and centered gripping of a glass pipe is possible.

To this end, there is provided a forced guiding which is formed by a slotted guiding member in a pressure sleeve and a carrier which is guided in the slotted guiding member and which is arranged on each of the clamping jaws. The forced guiding extends at a constant angle with respect to the longitudinal axis of the supply channel. In this instance, however, the active clamping force when gripping glass pipes with different outer diameters is always constant.

Another retention chuck is disclosed in DE 10 2008 058 211 A1. In this retention chuck, the clamping jaws are guided along guides which extend so as to be inclined with respect to the center line and toward the opening at the lower end of the supply channel. The gripping of glass pipes is thereby not free from displacement in the longitudinal direction, which may have a disadvantageous effect on the level of positioning precision of the glass pipes which can be achieved.

Another retention chuck, which is used for further processing of glass pipes at high temperatures, is known, for example, from CN 103073177 A. In this instance, however, no central supply channel is provided. Instead, there are provided two clamping jaws with V-shaped grooves which are adjusted by means of an eccentric actuation element. This arrangement is not suitable for the production of glass bottles (vials), cartridges or syringe bodies in machines with high cycle rates, which require rapid opening and closing of the clamping jaws.

JP 2001019451 A1 discloses a device for clamping glass rods for use in a redrawing process for redrawing a glass rod, with which the glass rod is intended to be subjected to no bending as a result of the clamping. In this instance, the glass rod is clamped sequentially above and below a furnace for renewed heating of the glass rod. In order to prevent a position change during the second clamping operation, the clamping jaws are in a first phase moved against a stop without applying a significant force and then, in a second phase, toggle lever elements are subsequently moved with a significant action of force. However, the toggle lever elements are not used to transmit a movement in the sense of a coupling element.

With regard to the further increasing demands on the product quality of glass containers for use as primary packaging means for pharmaceutical active ingredients, there is consequently room for further improvement.

SUMMARY

A general object of the present invention is to provide an improved retention chuck for machines which can be provided with glass pipes for producing glass containers, with which glass pipes can be reliably retained over a large range of diameters in a simple manner.

According to the present invention, a retention chuck for machines which can be supplied with glass pipes for producing glass containers is provided, in particular for producing glass bottles (vials), cartridges or syringe bodies, having a central supply channel for the glass pipes, a plurality of adjustable clamping jaws at the lower end of the supply channel which are arranged so as to be distributed around the opening thereof and whose spacing with respect to the center line of the supply channel can be adjusted, an actuation element for adjusting the clamping jaws, a coupling element or gear mechanism which couples the adjustable clamping jaws to the actuation element and guides in order to guide an adjustment movement of the clamping jaws perpendicularly relative to the center line of the supply channel and precisely radially inwardly.

According to the invention, the coupling element or gear mechanism has levers or the coupling element or gear mechanism is formed by levers which are each connected in an articulated manner to the actuation element and an associated clamping jaw. The levers and the leg lengths thereof provide parameters by means of which a characteristic line of the clamping force of the retention chuck can be adjusted in an appropriate manner for a large diameter range of the glass pipes. At the same time, the retention chuck can be used for a wide range of different diameters of the glass pipes without replacing the clamping jaws. A jaw set may in particular cover a diameter range of the glass pipes which is suitable for producing all commercially available primary packing means for pharmaceutical active ingredients, in particular for a range of outer diameters between 6 mm and 32 mm.

As a result of the adaptation of the retention forces over a large pipe diameter range, a glass pipe breakage or glass pipe damage and slippage of the glass pipe can be reliably prevented. Since the clamping jaws are adjusted precisely radially inward without any axial offset, when opening and closing the retention chuck there is brought about no axial offset of the glass pipe. The retention chuck according to the invention can thereby also be opened and closed very rapidly.

According to another embodiment, the actuation element is resiliently pretensioned by means of a spring against a base member of the retention chuck, wherein the coupling element or gear mechanism continuously reduces a ratio between a radially active clamping force of the clamping jaws and a resilient restoring force of the spring as the opening width of the clamping jaws decreases. Consequently, a particularly advantageous characteristic line of the retention chuck is possible since glass pipes with small outer diameters are generally distinguished by a lower mechanical stability and breaking resistance which requires relatively low clamping forces, whilst glass pipes with larger outer diameters are also distinguished by a greater mechanical stability and breaking resistance, which permits larger clamping forces which are also required for the greater weight thereof. A retention chuck according to the present invention may be adapted in a simple manner to these relationships by means of appropriate configuration of a toggle lever formed by the levers. To this end, in particular the leg lengths of the levers, the angle defined by the legs and the position of the rotation axles of the levers are available as parameters.

In this instance, the coupling element acts as a gear mechanism for changing an adjustment force of the actuation element which is preferably directed parallel with the longitudinal axis of the supply channel into a suitably translated and precisely radially inwardly directed adjustment force of all the clamping jaws, which to this end can be synchronously adjusted radially inward. The translation is in this instance preferably adjusted in such a manner that prevailing clamping forces for relatively small glass pipe diameters are comparatively small and continuously increase to higher glass pipe diameters, wherein in the characteristic line of the adjustment force there are preferably no discontinuities or reversal points.

According to another embodiment, the spring is arranged concentrically around the base member of the retention chuck and is supported against flange-like portions of the actuation element and of the base member of the retention chuck. This enables a particularly space-saving construction of the retention chuck with relatively few functional components. In order to adjust the resilient force, in this instance the spacing between the two flange-like portions can be adjusted, for example, by rotating a nut or adjusting the flange-like portion on the base member of the retention chuck.

According to another embodiment, the levers are constructed as angled levers having a first leg and a second leg, wherein the first leg is connected to the actuation element in an articulated manner and the second leg is connected to an associated clamping jaw in an articulated manner. The toggle lever principle which is thus enabled enables in a particularly simple manner in a relatively large range an adaptation of the clamping forces and adjustment paths to the outer diameter of the glass pipes.

According to another embodiment, the first legs extend substantially perpendicularly to the center line when the clamping jaws are adjusted radially inward almost as far as the center line, wherein the first legs extend in an inclined manner at an acute angle with respect to the lower end of the supply channel when the clamping jaws are opened to the maximum extent. At the end of the adjustment movement of the clamping jaws, that is to say, when the clamping jaws are adjusted relatively close to the center line of the actuation channel, the clamping jaws are consequently adjusted by a comparatively small adjustment path when the angled lever is adjusted. This corresponds to a range with comparatively small glass pipe diameters. For relatively large glass pipe diameters, the clamping jaws are in contrast adjusted over a comparatively large adjustment path when the angled lever is adjusted, which corresponds to correspondingly larger clamping forces which are possible, however, as a result of the higher mechanical stability and breaking resistance of glass pipes with larger outer diameters.

According to another embodiment, an advantageously simple construction is possible when at the front end of the first legs there is provided a pin which in each case is slidingly movably guided in a groove in the actuation element when at the front end of the second legs there is provided in each case a pin which is slidingly movably guided in a groove of the associated clamping jaw.

According to another embodiment, the grooves in the actuation element extend perpendicularly to the center line of the actuation element. For larger opening widths of the clamping jaws, it is in this instance preferable for the first leg of the angled lever to extend in an inclined manner at an acute angle with respect to the center line of the supply channel and in the direction of the opening at the lower end of the supply channel since in the case of an adjustment of the actuation element relatively large adjustment paths are then enabled. For smaller opening widths of the clamping jaws, it is in contrast preferable for the first leg of the angled lever to extend substantially horizontally, perpendicularly to the center line of the supply channel, since in the case of an adjustment of the actuation element only relatively small adjustment paths are then enabled.

According to another embodiment, the groove of the associated clamping jaw extends parallel with the center line of the actuation element. The sliding movement of the sliding pin in this groove therefore brings about only small tilting forces when the respective clamping jaw is adjusted.

According to another embodiment, the grooves are formed in the actuation element in guiding arms which protrude radially outward from the actuation element, whereby the position of the sliding pin at the front end of the first leg of the angled lever can advantageously be displaced radially outward.

According to another embodiment, the rotation axles of the levers are supported on a guiding block which is provided so as to be fixed to the lower end of the actuation element, in particular at the lower end of a rotationally movably supported shaft which encloses or directly forms the supply channel. The spacing of the rotation axles of the levers with respect to the center line of the supply channel consequently does not change when the retention chuck is adjusted, which enables an even more precise clamping of the glass pipes.

According to another embodiment, a portion of the actuation element in which there are formed the grooves, in which the pins are slidingly movably guided at the front ends of the first legs of the levers is constructed as a rotationally symmetrical member, in which, as a result of a machining processing operation by turning the actuation element, the above-mentioned grooves are formed. It is thus possible for tolerances in this region which is critical for the adjustment of the levers to be even more precisely complied with so that the levers as a whole can be adjusted in an even more precise manner. This is because it has been found that the tolerances with a machining production operation of such grooves by turning the actuation element automatically can be ensured with a high level of precision, that all the levers can be adjusted in a precise manner.

According to another embodiment, the guides are formed as cylindrical or polygonal guiding sleeves at the lower end of the guiding block, wherein the clamping jaws are constructed in a cylindrical or polygonal manner and so as to correspond to the cylindrical or polygonal guiding sleeves and are slidingly movably guided in the cylindrical or polygonal guiding sleeves. Particularly preferred in this instance are cylindrical cross-sectional shapes which can be produced in a cost-effective and precise manner by means of a simple machining processing operation by turning a workpiece.

According to another embodiment, which is also expressly intended to be considered to be an independent aspect of the invention and can be claimed independently, there is associated with each retention chuck a drive motor which is arranged directly on a shaft which encloses the supply channel in order to rotate the shaft with the retention chuck provided thereon. Consequently, the retention chucks of a hot-forming machine can be accelerated even more rapidly which enables according to the invention very high cycle rates of the hot-forming machine.

BRIEF DESCRIPTION OF THE DRAWINGS

The invention will be described below by way of example and with reference to the appended drawings, from which there result additional features, advantages and objectives which are intended to be achieved. In the drawings:

FIG. 2a is a sectioned illustration in the region of the clamping jaws according to FIG. 1 when a glass pipe is clamped with a comparatively small outer diameter;

FIG. 2b is a schematic illustration of the retention chuck according to FIG. 1 when a glass pipe is clamped with a comparatively small outer diameter;

In the figures, identical reference numerals refer to elements or element groups which are identical or have substantially the same effect.

DETAILED DESCRIPTION

Figure 3:
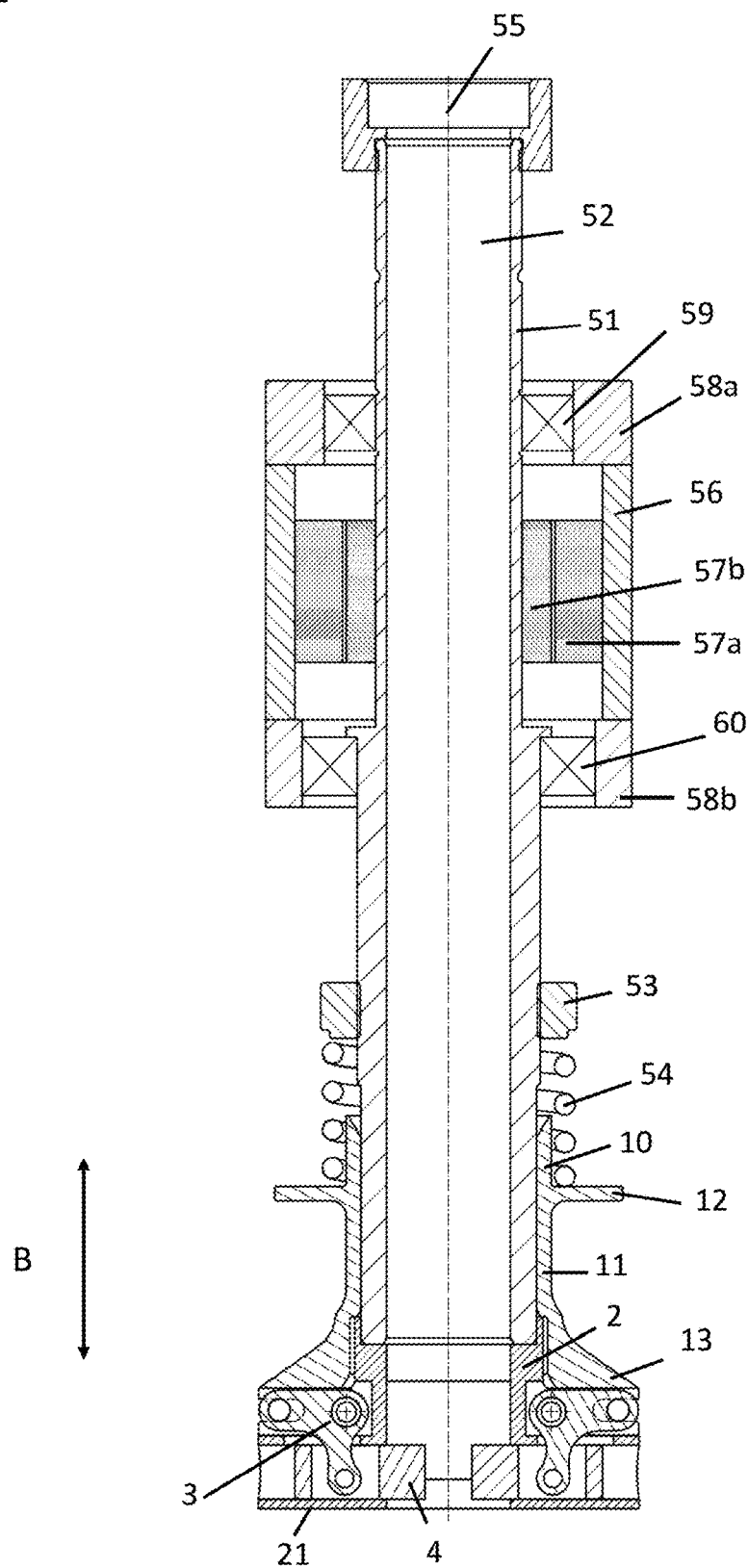
FIG. 3 is a schematic section of the retention chuck taken along line 3-3 of FIG. 2c.

Firstly, the general construction of a retention chuck according to the invention will be described with reference to FIG. 3.

The retention chuck 50 is arranged in a glass processing machine (not shown), for example, in a receiving member of a rotary plate. The retention chuck 50 comprises a base member 51 which is generally constructed in a rotationally symmetrical manner and in which there is formed a supply channel 52 which extends in a longitudinal direction for the glass pipe 9 which is intended to be retained and which extends as far as a guiding block 2 in which clamping jaws 4 for retaining the glass pipe (not shown) in a frictionally engaging manner are received so as to be guided. At the upper end of the base member 51, a drive motor is provided in order to displace the retention chuck in order to hot-form a retained glass pipe with a rapid rotation movement about the longitudinal axis of the supply channel 52. More specifically, the drive motor 57a, 57b is received in a motor housing 56 which is arranged directly on the outer side of the base member 51, in particular a shaft. In a practical application, the motor housing 56 is secured by means of a securing flange 58a, 58b or the like directly to a rotary ring of a hot-forming device (not shown). Bearings 59, 60 are provided between the drive motor 57a, 57b and the base member 51 or shaft so that the base member 51 or the shaft are moved by the drive motor 57a, 57b directly with a rotational movement. As a result of the small movable masses, the rotational movement can be rapidly accelerated and braked again, which according to the invention enables very high cycle rates of a hot-forming device.

Above the guiding block 2 which is provided so as to be fixed at the lower end of the supply channel 52 or the base member 51, there is arranged an actuation element 1 which is on the whole constructed in a rotationally symmetrical manner and which can be adjusted on the base member 51 in the actuation direction B, parallel with a longitudinal axis or center line of the supply channel 52, as indicated by the double-headed arrow.

Figure 4A:
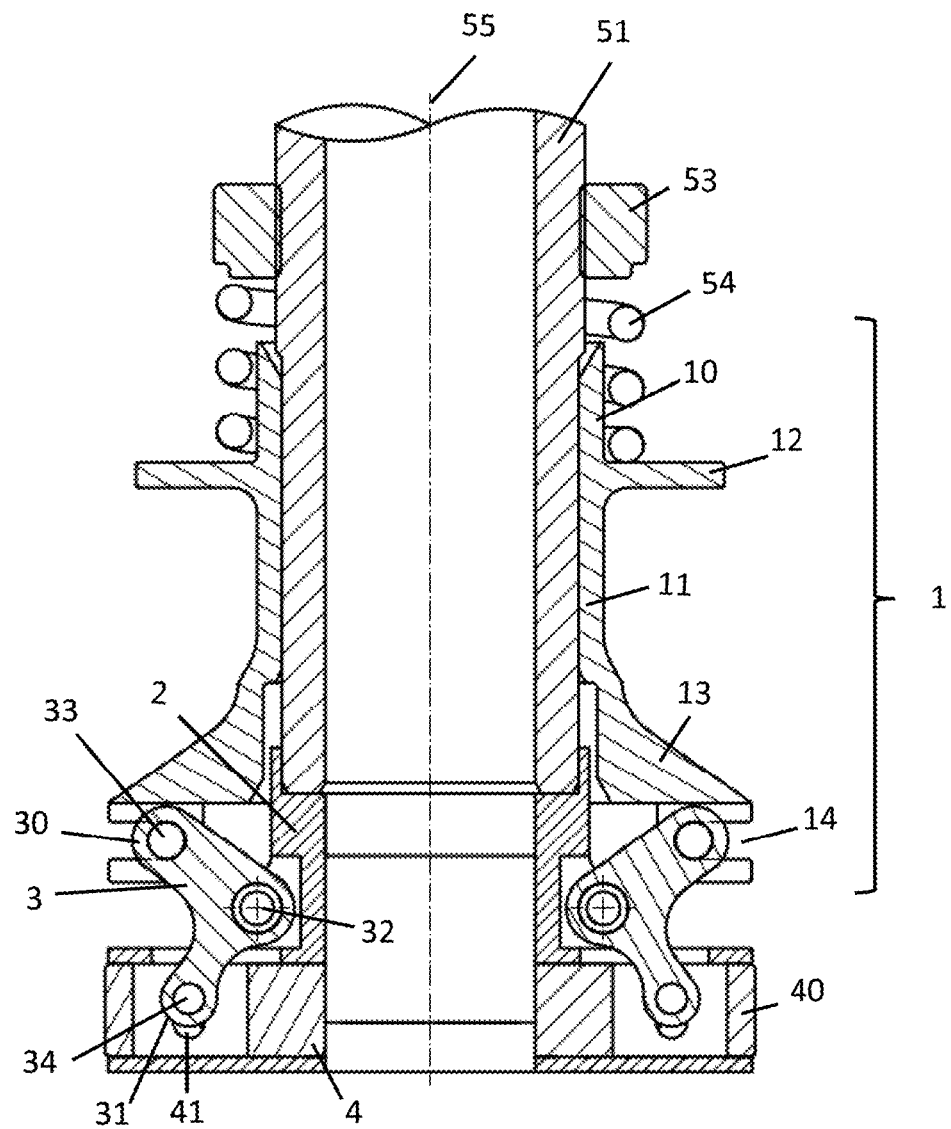
FIGS. 4a and 4b are schematic longitudinal sections of the lower portion of the retention chuck according to FIG. 3 in a position with a comparatively large opening width of the clamping jaws and in a position with a comparatively small opening width of the clamping jaws.
Figure 4B:
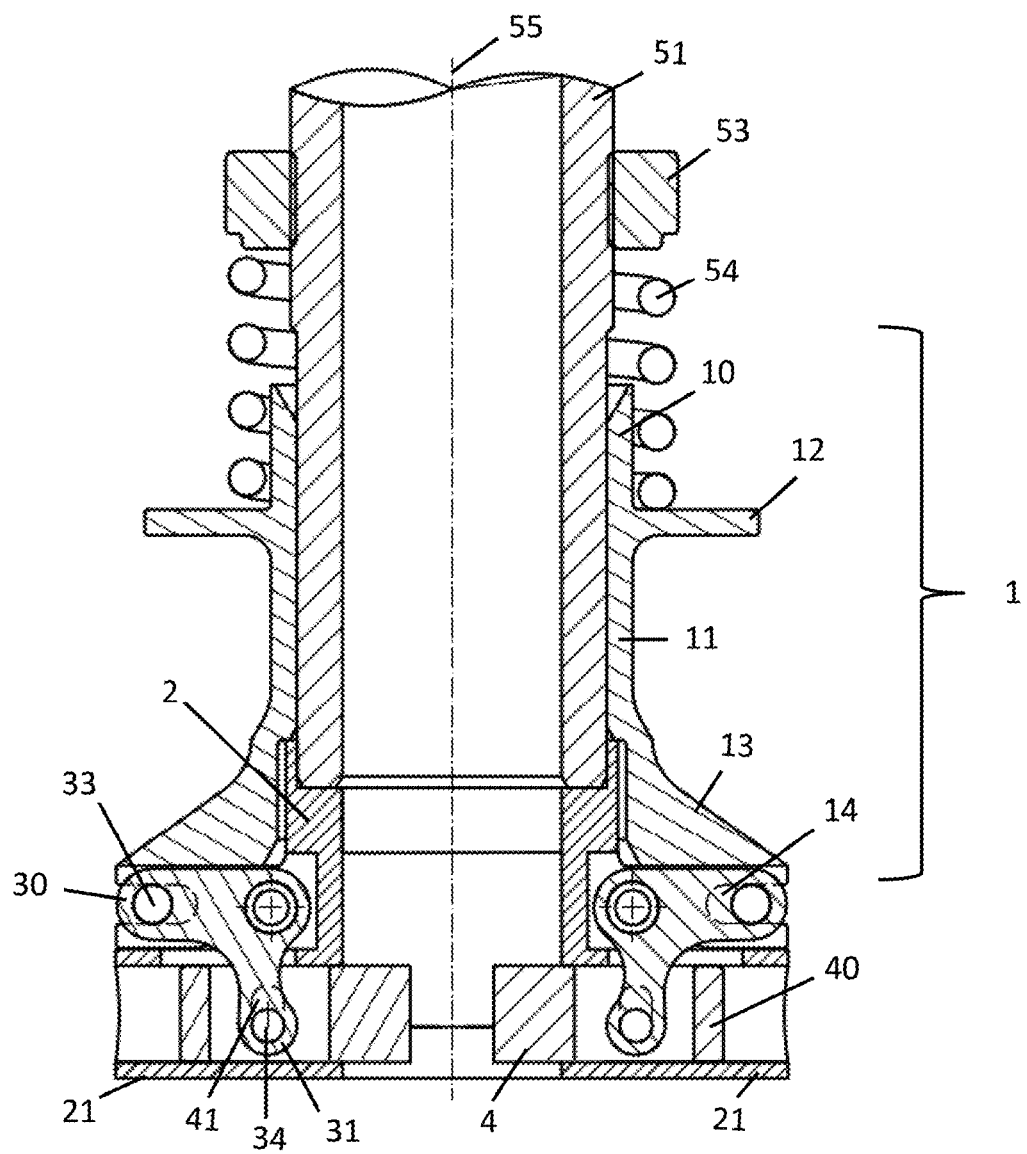

As shown in the FIGS. 4a and 4b, the actuation element 1 comprises a cylindrically constructed upper and lower sleeve 10, 11, between which there is formed a radially protruding flange 12 on which the lower end of the spring 54 is supported, the other end of which is supported on a spring stop 53 on the base member 51 in order to pretension the actuation element 1 resiliently against the base member 51. The resilient force of the spring 54 may, if required, be adjusted dependent on the product, for example, using a nut and by axially adjusting the spring stop 53 on the base member 51. The guiding block 2 is on the whole constructed in a cylindrical manner.

At least two clamping jaws 4 are arranged at the lower end of the guiding block 2 with uniform angular spacing with respect to each other. Preferably, at least three clamping jaws 4 are provided in order to clamp the glass pipe at least at three point-like regions in a uniform manner.

The clamping jaws 4 are supported in a slidingly movable manner in correspondingly constructed guiding sleeves 21 at the lower end of the guiding block. The guiding sleeves 21 are orientated in such a manner that the clamping jaws 4 are adjusted so as to be guided precisely radially inwardly toward the center line 55 of the supply channel. During the radial adjustment of the clamping jaws 4, according to the invention no axial displacement occurs. The clamping jaws 4 are synchronously adjusted by actuating the actuation element 1. For uniform clamping of the glass pipe, it should be ensured that all the clamping jaws 4 are of identical length.

For precise guiding of the clamping jaws 4, they have a cylindrical cross-section and they are guided in correspondingly constructed cylindrical guiding sleeves 21 of the guiding block 2. This has the advantage that the clamping jaws 4 can be precisely produced by means of a machining turning operation and also the guiding sleeves 21 can be precisely drilled or milled. In principle, however, other cross-sectional shapes of the clamping jaws 4 are also possible, in particular polygonal cross-sectional shapes.

The guiding sleeves 21 extend precisely in a horizontal manner, that is to say, perpendicularly to the center line 55 of the supply channel, so that the clamping jaws 4 during adjustment are guided precisely horizontally, radially inwardly and without any axial offset in order to retain the glass pipe without longitudinal displacement in a frictionally engaging manner, As a result of the guiding of the clamping jaws 4 precisely radially inwardly, there is no disruptive axial offset when a glass pipe is clamped.

The clamping jaws 4 are connected by means of associated levers 3 in an articulated manner to the actuation element 1. More specifically, there is provided at a front end of a first leg 30 of the lever 2 a sliding pin 33 which is supported slidingly movably in a guiding groove 14 which is formed in a guiding arm 13 at the lower end of the actuation element 1. Furthermore, at a front end of a second leg 31 of the lever 3 there is provided a sliding pin 34 which is slidingly movably guided in a guiding groove 21 which is formed in the respective clamping jaw 4.

By pressing on the clamping ring flange 12 in the direction of the spring 54 by means of an external force, the pretensioning force of the spring 54 can be overcome. The actuation element 1 then slides on the base member 51 in an upward direction and at the same time carries the three levers 3. The levers 3 are connected to the guiding block 2 by means of the sliding pins 34. The guiding block 2 is in turn slidingly movably guided in the actuation element 1. The levers 3 rotate about the guiding block 2. Rotary bearings and the clamping jaws 4 are thereby adjusted in order to adjust the opening width of the clamping jaws 4.

In order to compensate for the longitudinal difference between linear and rotary movements, the components (actuation element 1 and clamping jaws 4) are provided with guiding grooves which are advantageously constructed as elongate holes. The orientation of these guiding grooves or elongate holes is determined by whether radial or axial movement components have to be blocked or free.

Preferably, the guiding groove 14 extends in the guiding arm 13 precisely in a horizontal direction, perpendicularly to the center line 55 of the supply channel. Furthermore, the guiding groove 41 extends in the respective clamping jaw 4 preferably in a precisely vertical manner, parallel with the center line 55 of the supply channel. In principle, however, other orientations of the guiding grooves 14, 41 are also possible since, in any case as a result of the orientation of the guiding sleeves 21, a precisely horizontal adjustment movement of the clamping jaws 4 is ensured. However, the orientations of the guiding grooves 14, 41 shown in FIGS. 4*a* and 4*b* enable a relatively force-saving adjustment of the clamping jaws 4.

The rotation axles 32 of the levers 3 are supported in the guiding block 2 which, as a result of its fixed arrangement at the lower end of the supply channel and the radially symmetrical forces present at that location, always allows a support of the rotation axles 32 with a constant spacing from the center line 55 of the supply channel. The rotation axles 32 can, as shown in FIG. 3, be supported in holes in the guiding block 2.

For an even more precise fixing of the positions of the levers 3 and the pivot movement thereof about the rotation axles 32, however, it is preferable for the guiding grooves 14 to be constructed to guide the sliding pins 30 by means of machining turning of the actuation element 1. This is because, by means of a machining turning of the actuation element 1, it can be ensured that all the guiding grooves can be produced with small tolerances and guide the sliding pins 30 precisely radially inward or outward. The sliding pins 30, 31 of the levers 3 may be constructed as cylindrical securing pins which are guided in a secured manner by means of securing rings in the associated guiding grooves 14, 41.

As can be seen in FIGS. 4*a* and 4*b*, the lever 3 is constructed as an angled lever, wherein the two legs 30, 31 of the lever 3 define an angle with each other which is advantageously in the range between 45° and 135° and preferably in the range between 60° and 120° and even more preferably is 90° or deviates by only a few degrees from 90°.

The lever 3 enables an advantageous transmission of the adjustment of the actuation element 1 in the actuation direction B according to the toggle lever principle into an adjustment of the clamping jaws 4 in the horizontal direction, perpendicularly to the center line of the supply channel. The specific feature of the toggle lever principle involves the translation ratio of force applied to resulting force or of primary travel to secondary travel during the movement being able to be continuously displaced. This enables according to the invention the clamping jaws 4 during their adjustment to first be able to be moved rapidly and with a relatively large travel toward the glass pipe, the clamping jaws 3 in a central region being able to be moved toward the glass pipe at a medium speed and medium travel and the clamping jaws 4 for small glass pipe diameters finally being able to be moved toward the glass pipe at a low speed and very small travel.

This corresponds to the clamping forces prevailing in the above-mentioned regions: for relatively large glass pipe outer diameters, the clamping force produced by the clamping jaws 4 is comparatively large, for medium-sized glass pipe outer diameters, the clamping force produced by the clamping jaws 4 is medium-sized and, for small glass pipe outer diameters, the clamping force produced by the clamping jaws 4 is comparatively small. The clamping forces prevailing can consequently be adapted over a wide diameter range in an optimum manner to the stability of glass pipes since glass pipes with relatively large diameters are distinguished by a higher stability, whereas glass pipes with relatively small diameters are distinguished by a lower stability.

As can be seen in FIGS. 4*a* and 4*b*, the lever 3 in the range of relatively large glass pipe diameters (FIG. 4*a*) is orientated in such a manner that the first leg 30 extends in an inclined manner at an acute angle to the lower end of the supply channel, whilst the lever 3 is orientated in the range of relatively small glass pipe diameters (FIG. 4*b*) in such a manner that the first leg 30 extends substantially perpendicularly to the center line 55. At the same time, the sliding pin 33 at the front end of the first leg 30 in the range of relatively large glass pipe diameters (FIG. 4*a*) is arranged relatively far inside the guiding groove 14 and the sliding pin 34 at the front end of the second leg 31 in the upper or central region of the guiding groove 41 is arranged in the clamping jaw 4, whilst the sliding pin 33 at the front end of the first leg 30 in the range of relatively small glass pipe diameters (FIG. 4b) is located relatively far outward in the guiding groove 14 and the sliding pin 34 at the front end of the second leg 31 in the lower region of the guiding groove 41 is located in the clamping jaw 4. In this manner, using the retention chuck, a very large range of glass pipe diameters can be covered. Ideally, the lever ratios are selected in such a manner that all conventional glass pipe diameters for producing primary packaging means for pharmaceutical active ingredients, in particular glass bottles (vials), cartridges or syringe bodies, are covered, in particular a range between approximately 6 mm and 32 mm.

Figure 1:
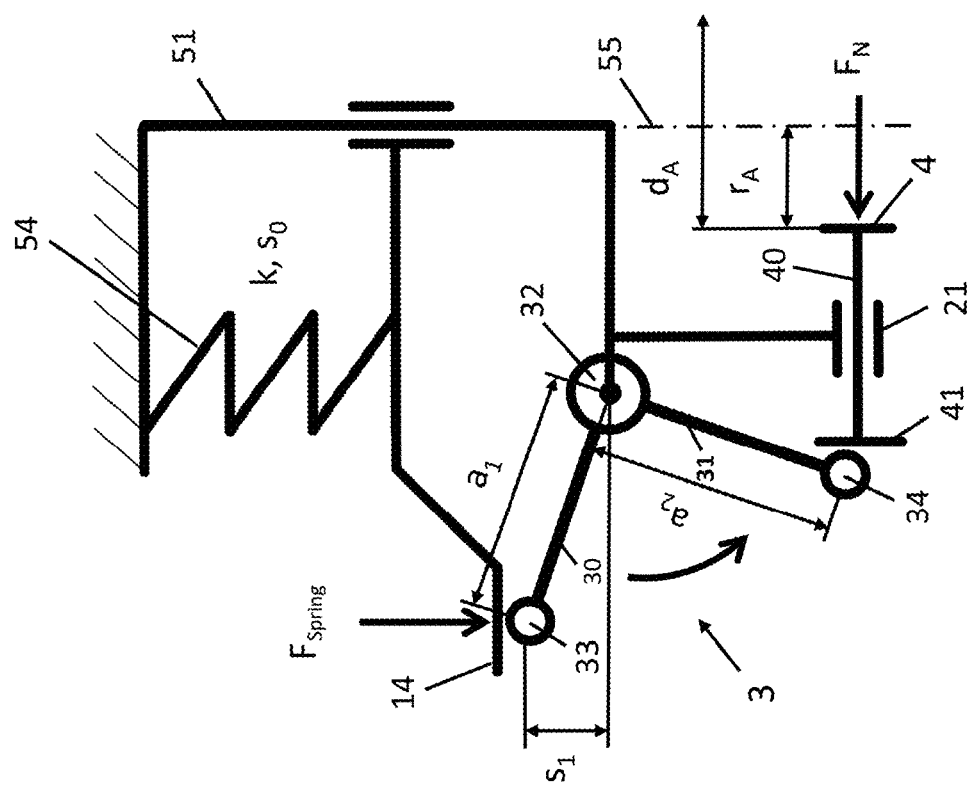
FIG. 1 is a schematic illustration of a retention chuck according to the present invention, with a depiction of preferred lever ratios.
Figure 2D:
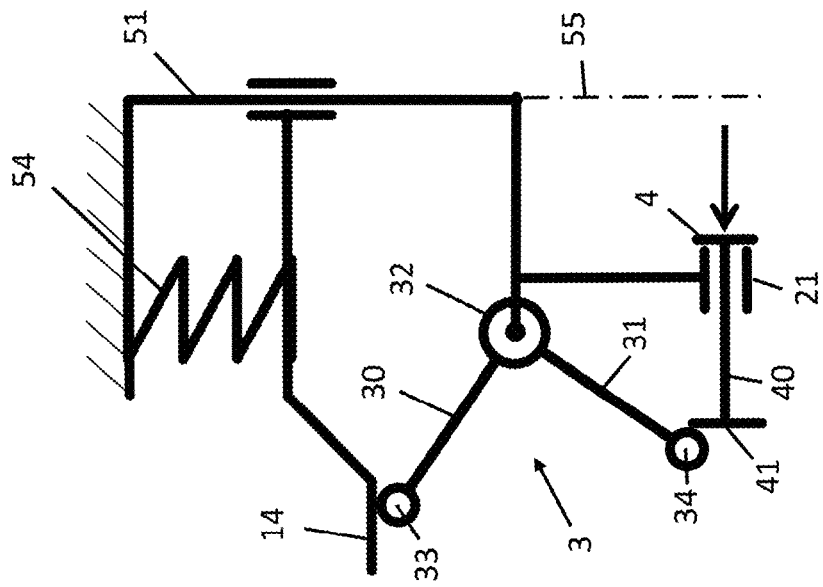
FIG. 2d is a schematic illustration of the retention chuck according to FIG. 1 in a position with a comparatively large opening width of the clamping jaws.
Figure 2C:
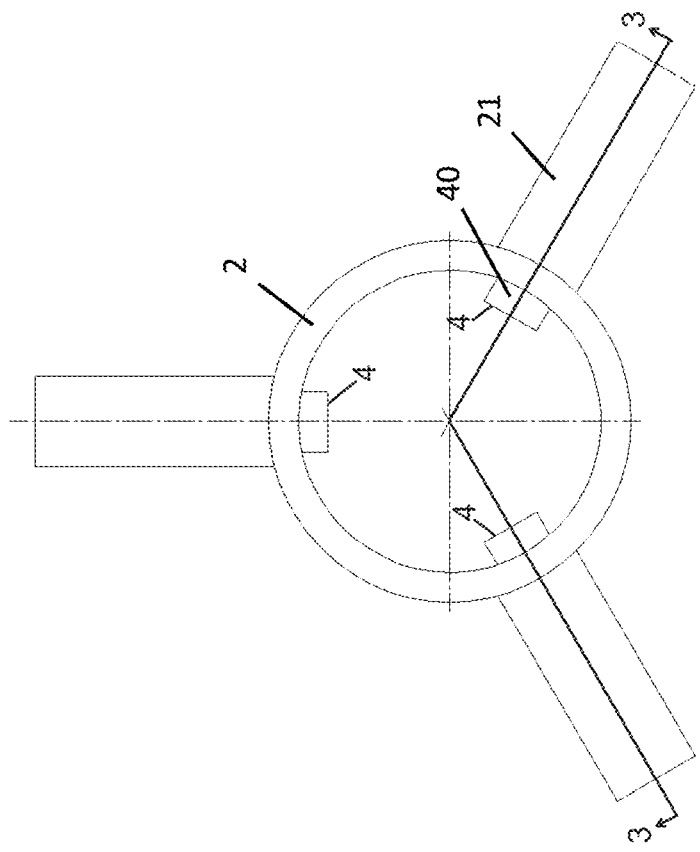
FIG. 2c is a sectioned illustration in the region of the clamping jaws according to FIG. 1 in a position with a comparatively large opening width of the clamping jaws.

FIG. 1 combines in a schematic illustration preferred lever ratios of a retention chuck according to the present invention: The following variables are set out therein:

k: Spring constant
$s_0$: Spring pretensioning
$s_1$: Spring path
$a_1$: Leg length of the first leg 30
$a_2$: Leg length of the second leg 31

There is for the dependency of the clamping force on the spring path s:

$$F_N(s) = \frac{a_1}{a_2} \times \cos^2(\alpha) \times F_{Spring}$$
$$= \frac{a_1}{a_2} \times \cos^2\left(\sin^{-1}\left(\frac{s}{a_1}\right)\right) \times k \times s$$

This dependency can for the preferred case of identical leg lengths be simplified as $a_1 = a_2$:

$$F_N(s_1) = \cos^2\left(\sin^{-1}\left(\frac{s_1}{a_1}\right)\right) \times k \times (s_0 + s_1) \text{ for } a_1 = a_2$$

Furthermore, there applies to the preferred case of identical leg lengths:

$$r_A(s_1) = 6.5 + s_1 \text{ for } a_1 = a_2$$

$$d_A(s_1) = 13 + 2 \times s_1 \text{ for } a_1 = a_2$$

By appropriately selecting the leg lengths, the force ratios for the different ranges of glass pipe diameters can thus be adjusted in an appropriate manner according to the invention.

FIGS. 2a to 2d combine for a preferred embodiment of the toggle lever the angle ratios and geometry during clamping for relatively small and relatively large opening widths of the clamping jaws.

Figure 5:
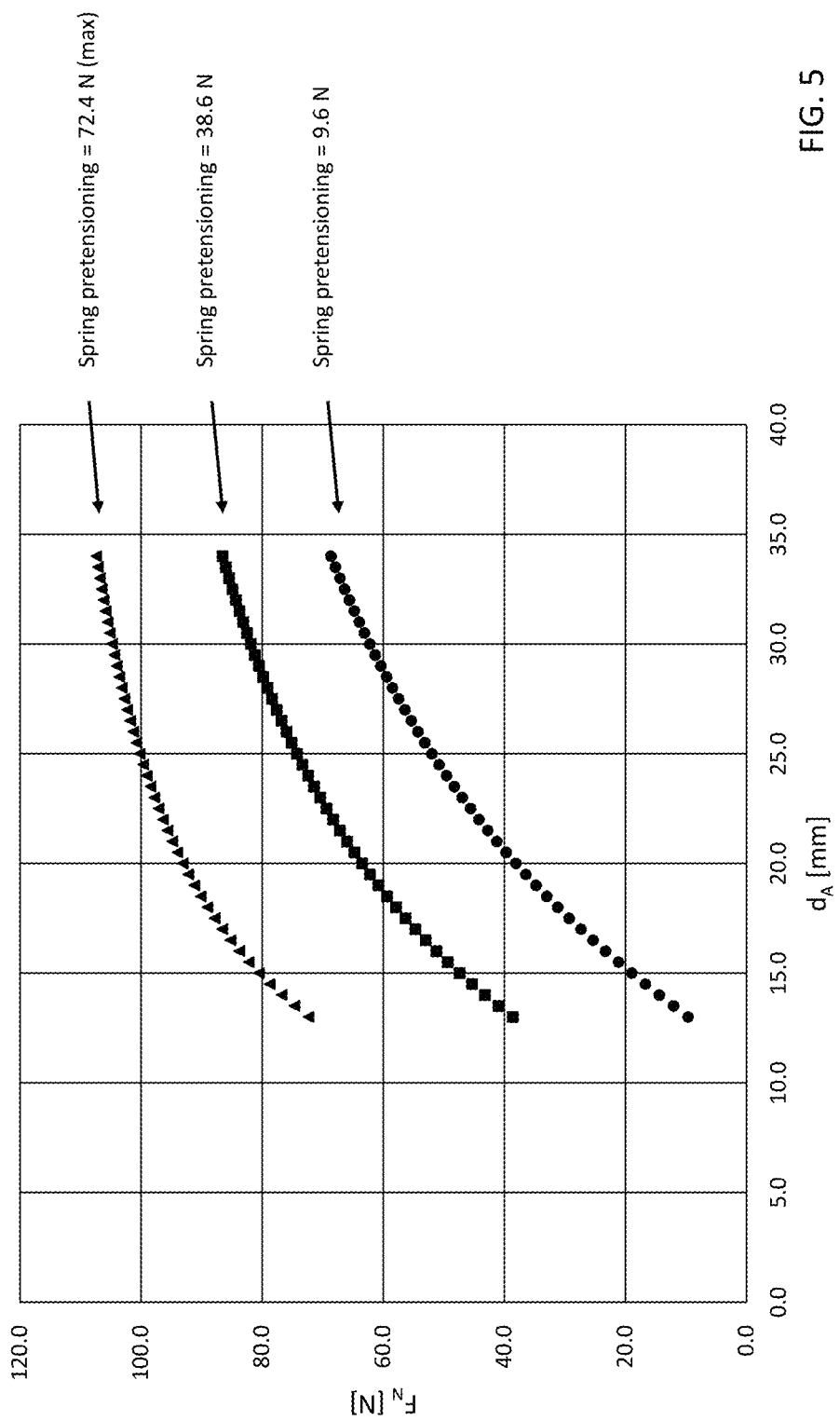
FIG. 5 shows typical characteristic lines of a retention chuck according to the present invention for different spring pretensions.

FIG. 5 shows typical characteristic lines of a retention chuck according to the present invention for different spring pretensionings. It can be seen that the prevailing clamping forces for relatively small glass pipe diameters are comparatively small and increase continuously to higher glass pipe diameters, preferably without discontinuities or reversal points being able to be seen in the characteristic lines.

As the person skilled in the art will readily be able to see, the retention chuck according to the present invention can also be used accordingly to produce other types of glass containers which are produced by means of hot-forming from glass pipes, in particular generally for producing glass packaging means, also with larger dimensions than usual for storing pharmaceutical active ingredients.

LIST OF REFERENCE NUMERALS

| | |
|---|---|
| 1 | Actuation element |
| 2 | Guiding block |
| 3 | Angled lever |
| 4 | Clamping jaw |
| 9 | Glass pipe |
| 10 | Upper sleeve |
| 11 | Lower sleeve |
| 12 | Flange |
| 13 | Guiding arm |
| 14 | Guiding groove |
| 15 | Aperture |
| 21 | Guiding sleeve |
| 25 | Securing groove |
| 30 | First lever arm |
| 31 | Second lever arm |
| 32 | Rotation axle |
| 33 | First sliding pin |
| 34 | Second sliding pin |
| 40 | Clamping jaw cylinder |
| 41 | Guiding groove |
| 50 | Retention chuck |
| 51 | Base member |
| 52 | Supply channel |
| 53 | Spring stop |
| 54 | Clamping spring |
| 55 | Center line |
| 56 | Motor housing |
| 57a, 57b | Drive motor |
| 58a, 58b | Securing flange |
| 59 | Bearing |
| 60 | Bearing |
| B | Actuation direction |

What is claimed is:

1. A retention chuck for glass pipes, comprising:
a central supply channel being configured to pass the glass pipes through the central supply channel, the central supply channel having an opening at a lower end and a center line;
a plurality of clamping jaws arranged around the opening at the lower end and distributed around the center line, wherein the plurality of clamping jaws have a spacing from the center line that is adjustable;
an actuation element configured for common adjustment of the spacing of all of the plurality of clamping jaws;
a coupling element that couples the plurality of clamping jaws to the actuation element, the coupling element comprises a plurality of levers, each lever being connected in an articulated manner to the actuation element and to a respective one of the plurality of clamping jaws, wherein each lever comprises a first leg angled with respect to a second leg, wherein the first leg is connected to the actuation element in an articulated manner and the second leg is connected to the respective one of the plurality of clamping jaws in an articulated manner, wherein the first leg has a pin that is slidingly movably guided in a groove in the actuation element, wherein the second leg has a pin that is slidingly movably guided in a groove of the respective one of the plurality of clamping jaws, wherein the actuation element further comprises guiding arms in which the grooves in the actuation element are formed, and wherein the guiding arms protrude radially outward from the actuation element; and
a guiding sleeve associated with and containing one each of the plurality of clamping jaws, the guiding sleeve guiding the common adjustment of each of the plurality of clamping jaws, respectively, perpendicularly, radially inwardly relative to the center line, wherein each of the clamping jaws is slidingly moveable within the associated guiding sleeve.

2. The retention chuck of claim 1, wherein the plurality of clamping jaws comprises at least three clamping jaws.

3. The retention chuck of claim 1, further comprising a base member, wherein the actuation element further comprises a single spring that resiliently pretensions the actuation element against the base member, wherein the coupling element is configured in such a manner that a ratio between a radially active clamping force of the plurality of clamping jaws and a resilient restoring force of the single spring is continuously decreased as an opening width of the clamping jaws decreases towards the centerline.

4. The retention chuck of claim 3, wherein the actuation element comprises flange portions, wherein the single spring is arranged concentrically around the base member and is supported against the flange portions and the base member.

5. The retention chuck of claim 4, wherein the base member comprises a spring stop against which the single spring is supported, and wherein the spring stop has a position along the center line that is adjustable to adjust the resilient restoring force of the single spring.

6. The retention chuck of claim 1, wherein the first leg extends perpendicularly to the center line when the clamping jaws are adjusted radially inward to a minimum extent proximate the center line, and wherein the first legs extend in an inclined manner at an acute angle with respect to the lower end of the supply channel when the clamping jaws are opened to a maximum extent remote from the center line.

7. The retention chuck of claim 1, wherein the grooves in the actuation element extend perpendicularly to the center line, and wherein the grooves of the plurality of clamping jaws extend parallel with the center line.

8. The retention chuck of claim 1, wherein the actuation element has a portion in which the grooves are formed, and wherein the portion is a rotationally symmetrical member.

9. The retention chuck of claim 1, further comprising a guiding block fixed at the lower end, wherein each of the levers has a rotation axle supported on the guiding block.

10. The retention chuck of claim 9, wherein the guiding sleeves are formed at a lower side of the guiding block.

11. The retention chuck of claim 1, wherein the plurality of clamping jaws have a shape corresponding to the guiding sleeves.

12. The retention chuck of claim 11, wherein the shape is cylindrical or polygonal.

13. The retention chuck of claim 1, further comprising a shaft that encloses the supply channel.

14. The retention chuck of claim 13, further comprising a drive motor arranged directly on the shaft, the drive motor being configured to rotate the shaft with the retention chuck provided thereon.

15. A retention chuck for glass pipes, comprising:
a central supply channel having a center line and being configured to allow movement of the glass pipes through the central supply channel along the center line without contacting an internal surface of the supply channel, the central channel having a lower end with an opening;
three clamping jaws arranged at the lower end and evenly distributed around the center line and the opening, wherein the three clamping jaws have a spacing from the center line that is adjustable;
a guiding sleeve associated with and containing one each of the three clamping jaws, wherein each of the clamping jaws is slidingly moveable within the associated guiding sleeve;
an actuation element configured for common adjustment of the spacing of all three of the three clamping jaws, the actuation element having a flange;
three levers, each lever being connected in an articulated manner to the actuation element and to a respective one of the three clamping jaws, wherein each lever comprises a first leg angled with respect to a second leg, wherein the first leg is connected to the actuation element in an articulated manner and the second leg is connected to the respective one of the plurality of clamping jaws in an articulated manner, wherein the first leg has a pin that is slidingly movably guided in a groove in the actuation element, wherein the second leg has a pin that is slidingly movably guided in a groove of the respective one of the plurality of clamping jaws, wherein the actuation element further comprises guiding arms in which the grooves in the actuation element are formed, and wherein the guiding arms protrude radially outward from the actuation element;
a single spring arranged concentrically around the center line; and
a spring stop compressing the single spring between the spring stop and the flange, the single spring being configured and positioned to provide a radially active clamping force to the three clamping jaws towards the center line, the spring stop having a position along the center line that is adjustable to adjust the radially active clamping force.

16. The retention chuck of claim 15, wherein the first leg extends perpendicularly to the center line when the three clamping jaws proximate the center line, and wherein the first legs extends in an inclined manner at an acute angle with respect to the lower end of the supply channel when the three clamping jaws are remote from the center line.

17. A retention chuck for glass pipes, comprising:
a central supply channel for the glass pipes, the central channel having a lower end and a center line;
a plurality of clamping jaws arranged at the lower end and distributed around the center line, wherein the plurality of clamping jaws have a spacing from the center line that is adjustable;
an actuation element having guiding arms, where each of the guiding arms has a groove formed therein, the guiding arms protruding radially outward from the actuation element;
a coupling element that couples the plurality of clamping jaws to the actuation element, the coupling element comprises a plurality of levers, each lever being connected in an articulated manner to the actuation element and to a respective one of the plurality of clamping jaws; and
a guiding sleeve for each of the plurality of clamping jaws, the guiding sleeve guiding the common adjustment of plurality of clamping jaws, respectively, perpendicularly, radially inwardly relative to the center line,
wherein each lever comprises a first leg angled with respect to a second leg, wherein the first leg is connected to the actuation element in an articulated manner and the second leg is connected to the respective one of the plurality of clamping jaws in an articulated manner, wherein the first leg has a pin that is slidingly movably guided in the groove of the actuation element, and wherein the second leg has a pin that is slidingly movably guided in a groove of the respective one of the plurality of clamping jaws.

\* \* \* \* \*